United States Patent Office 2,736,668
Patented Feb. 28, 1956

2,736,668
PROCESS OF METHOXYLATING THE SURFACE OF A SILICEOUS MATERIAL, AND THE RESULTING PRODUCT

Edward C. Broge, Cecil County, Md., assignor to E. I. du Pont de Nemours and Company, Wilmington, Del., a corporation of Delaware No Drawing. Application May 9, 1952,
Serial No. 287,045

11 Claims. (Cl. 106—308)

This invention relates to novel surface-methoxylated siliceous materials and methods for making them by surface-esterifying siliceous substrates with methanol, and is more particularly directed to compositions which are organophilic solids in a super-colloidal state of subdivision having an internal structure of inorganic siliceous material with a specific surface area of at least one square meter per gram and having methoxy groups chemically bound to said internal structure, and is further particularly directed to processes for making such products in which an inorganic siliceous material having a specific surface area of at least one square meter per gram is brought into contact with methanol and the system is heated under anhydrous conditions at a temperature above about 100° C., whereby chemical combination of methoxy groups with the siliceous substrate is effected.

By surface-modifying siliceous materials with methoxy groups according to the present invention it is possible to make the siliceous materials more compatible with organic systems. The methoxylated siliceous materials wet readily into organic liquids and even into organic plastic masses such as elastomers. The products are organophilic in that they possess this property of easy mixing with organic materials.

Heretofore it has been considered that methyl esters of siliceous materials were not sufficiently stable even under mild conditions to have practical value and that even by crowding the surface of the siliceous material with methoxy groups hydrophobic character could not be imparted to the product.

Now according to the present invention it has been found that valuable compositions can be made by effecting combination of methoxy groups with siliceous materials of the type described if a suitably large proportion of methoxy groups per unit of surface area is so combined. With the class of siliceous substrates broadly described above, 400 methoxy groups per hundred square millimicrons of substrate surface area is sufficient to accomplish the desired result and with certain types of substrate even smaller proportions of methoxy groups will produce products of valuable properties.

It has further been found that products of the high degree of methoxylation above described can be made by starting with an inorganic siliceous material having a specific surface area of at least one square meter per gram (1 m.$^2$/g.), bringing this siliceous substrate into contact with methanol and heating the mixture under anhydrous conditions at a temperature above about 100° C. At these temperatures it is necessary, of course, to carry out the reaction under elevated pressure and it is preferred to remove water repeatedly or continuously during the reaction since water is formed during the esterification.

A considerable class of siliceous materials may be used as the substrate for esterification according to a process of the invention. Such substrates will now be described in detail.

THE MATERIALS ESTERIFIED

*Composition*

The materials which are esterified according to the process of this invention form the skeletons or internal structures of the new products which are made by the esterification process. These materials are in the solid state. They are siliceous. They can be amorphous silica. They can be water-insoluble metal silicates. They can be water-insoluble metal silicates coated with amorphous silica. In any event they must have surface silanol groups (—SiOH) and preferably their surfaces are substantially covered with silanol groups. These materials are inorganic. They contain substantially no chemically bound organic groups.

*Sizes and shapes*

The inorganic siliceous solids are in a supercolloidal state of subdivision. They are too large to form a stable colloidal solution which will pass through a filter. Colloidal solutions are usually defined as those solutions in which the solutes have particle diameter in the range from 1 to 100 millimicrons. As the particle diameter increases over 100 millimicrons, the solute shows an increasing tendency to settle where the solute and solvent have different densities. When any one dimension of a solute particle is 150 millimicrons or greater this tendency is so marked that there can be little doubt that the particles are supercolloidal. Accordingly, by a supercolloidal state of subdivision, I mean that the particles of the inorganic siliceous solid have at least one dimension of at least 150 millimicrons. In most cases, the solids I have worked with consisted of coherent aggregates which had an average particle diameter of at least 1 micron. At this size, or above, the inorganic siliceous solid is readily removed from suspension in liquid medium by filtration. Once a filter cake is formed on the filter, the cake tends to trap particles down to about 150 millimicrons in one dimension. Smaller particles tend to pass through the filter.

If the solid is non-porous (devoid of pores large enough to permit penetration by nitrogen molecules) it must be finely divided. If the solid is subdivided into substantially spherical non-porous particles, the average particle diameter must not exceed about 2–3 microns.

Preferably, inorganic siliceous solids having numerous pores, voids or interstices therein are used. These materials are porous. By this I mean that they have exposed surfaces in the interior of the lump or particle which are connected to the exterior so that liquids and gases can penetrate the pores and reach the exposed surfaces of the pore walls. In other words, the solid forms a three-dimensional network or webwork through which the pores or voids or interstices extend as a labyrinth of passages or open spaces.

Especially preferred are porous inorganic siliceous solids having average pore diameters of at least four millimicrons.

Porous inorganic siliceous solids, such as amorphous silica, can be visualized as consisting of coherent aggregates of extremely small, non-porous, substantially spherical, ultimate silica units. A coherent aggregate is one in which the ultimate tiny units are so firmly attached to each other that they cannot be separated by suspension in fluid medium. Such an aggregate can be pulverized by grinding and attrition. When these aggregates are made up of ultimate units joined in a fairly open three-dimensional network, they are pulverulent and can be easily disintegrated to fine powders having particle sizes in the range of 1–10 microns. These powdery particles retain the porous or network structure. The ultimate units are chemically bound together by siloxane bonds (Si—O—Si) so that the coherent aggregates can properly be thought of as chemical compounds of high molecular weight.

Coherent aggregates of amorphous silica can also be considered as gel structures. The term coherent aggregate includes conventional silica gel. However, it includes materials so different from conventional silica gel that to call them gels could be misleading. In conventional silica gels the ultimate spherical units are below 10 millimicrons in diameter, in fact, they are usually below 5 millimicrons in diameter, and are so closely packed that the pores or interstices are very tiny. For many purposes, particles having ultimate units of 10 to 100 millimicrons' average diameter, or ultimate units below 10 millimicrons' diameter joined in very open networks (large pore size), are much more advantageous than conventional silica gels, and are preferred. When the siliceous material is a metal silicate the ultimate units usually take non-spherical shapes, such as needles, rods, plates, etc.

Since the coherent aggregates of porous inorganic siliceous solid have labyrinths of pores throughout their structures, and since the total exposed surface area of the pore walls is many times the exposed surface area on the external walls of said solid, the state of subdivision can vary widely without much change in the total exposed surface area of a given mass. In other words, for the purposes of this invention, if there is a proper amount of surface area for a given mass of inorganic siliceous solid, then it is technically immaterial whether the solid is in pieces the size of a baseball or larger or is comminuted to a fine powder. Nevertheless, there is a practical maximum particle size, as far as the process of this invention is concerned, because of the fact that in very large masses, for example, several inches in diameter, diffusion of the esterifying agent and water through the pores takes place very slowly, so that the esterification process may become impractical. It is therefore preferred to have the supercolloidal particles in a relatively finely divided condition, in order to promote rapid interaction with the esterifying agent. Ordinarily, this means that the supercolloidal particles should be sufficiently fine to pass through, for example, a screen having 100 meshes per linear inch. Particles this small are powders. Powders are preferred.

Various methods of measuring particle size are discussed hereinafter under the heading, "Analytical methods."

Specific surface area

The inorganic siliceous solids have large surface areas in relation to their mass. The relationship of surface area to mass is usually expressed as "specific surface area" either in the ratio of square meters per grams ($m.^2/g.$) or of square yards per pound ($yd.^2/lb.$). As used in this application, specific surface area will be expressed numerically in $m.^2/g.$ as determinable by the nitrogen adsorption. The method for making the determination will be discussed hereinafter under the heading, "Analytical methods."

Solids of high specific surface area have behavior characteristics quite different from those of low specific surface area. Thus the adsorptive characteristics of porous carbon black and silica gel are well known. Also the filling, strengthening and reinforcing value of pigments is dependent on their specific surface areas. Likewise chemical activity in catalysis is a function of specific surface area. So, also, in the process of this invention there is a point below which no important contribution is made by surface esterification.

According to the present invention the threshold value of specific surface area of the materials to be esterified is about 1 $m.^2/g.$ For inorganic siliceous solids subdivided into essentially spherical non-porous particles, this corresponds to an average particle diameter of about 2–3 microns. The specific surface area becomes quite significant at about 25 $m.^2/g.$ This corresponds to a particle diameter of about 100 millimicrons for essentially spherical non-porous particles. Since this is below the size range of supercolloidal particles, it at once becomes apparent that, while the invention includes non-porous inorganic siliceous solids in a supercolloidal state of subdivision, for many purposes, this invention is concerned with inorganic siliceous solids having pores, voids or interstices therein, i. e., coherent aggregates.

Amorphous silica

One of the preferred siliceous solids which is surface-esterified by the process of this invention, is precipitated amorphous silica. Amorphous silica can be obtained in a much more finely divided form than crystalline silica, since in the case of the latter, finely divided material can be obtained only by grinding or attrition processes, which gives particles no finer than several microns diameter. Amorphous silica can be obtained as a precipitate consisting of coherent aggregates of extremely small non-porous ultimate units, which aggregates are much smaller than can be produced by grinding. Such amorphous silica is further characterized by X-rays as lacking crystalline structure.

It is preferred to use amorphous silica in the form of supercolloidal aggregates in which the pores or spaces between the ultimate units have an average diameter, as determined from nitrogen adsorption curves, of at least 4 millimicrons.

In silica aggregates or gels in which the average pore diameter is smaller than about 4 millimicrons, the structure, i. e., the bonds between the ultimate units, is so hard and strong that comminution is extremely difficult, and in fact cannot be accomplished by practical means. Such material can still be reacted with methanol in such a way as to cover the external walls and most of the internal walls of the super-colloidal aggregates, but if this structure is broken apart by extreme mechanical means, the freshly formed silica surfaces which are formed by fracturing the aggregate structure, and which are hydrophilic, amount to such a high percentage of the total final surface that the disintegrated product has a relatively large proportion of unesterified surface.

On the other hand, where the supercolloidal aggregates have a looser structure and contain pores of at least about 4 millimicrons' average diameter, the surface is easily accessible to alcohol, and the structure is ordinarily weaker, mechanically. These coarser pores may be the result of a much looser packing of small ultimate units which may be, for example, 5 to 10 millimicrons in diameter, or the pores may be large due to the fact that the ultimate units are larger, for example 20 or 30 millimicrons in diameter, and therefore the spaces between the ultimate spherical units are naturally larger even in closely packed structures.

The ultimate spherical units constituting the aggregates are preferably quite uniform in size. Ultimate units having diameters smaller than about 10 millimicrons can become packed so closely together as to have pores below the minimum preferred size. Hence, preparation of such aggregates requires special care as will be discussed hereinafter. Spherical units having diameters larger than about 100 millimicrons have specific surface areas less than about 25 $m.^2/g.$, and are therefore not preferred, for reasons stated above. Where the coherent aggregates have ultimate units of about 10–100 millimicrons' average diameter, pore size problems are minimized. This, then is a preferred type of material to be esterified. Finely divided silica powders of this type consisting of ultimate units 10–100 millimicrons in diameter, linked together to form supercolloidal coherent aggregates, are also preferred because such powders are especially easy to filter and process.

Units in this size range can be observed in the electron microscope, and the average unit diameter determined by direct measurement. However, in the electron microscope it is impossible to tell whether the units are linked directly together through a coalescence (siloxane linkage) of the units to a greater or less degree, or whether the units are separate and discrete particles lying together only in loose contact. If the latter is the case, the units may be readily re-dispersed in fluid medium to a colloidal state, and the silica does not, therefore, consist of supercolloidal aggregates. On the other hand, in the case of the coherent aggregates of the type which may be esterified by the process of this invention, the ultimate units are linked together through primary chemical bonds, presumably siloxane linkages. The degree to which the silica units are linked together may be determined by comparing the apparent surface area, as calculated from the unit diameter observed in electron micrographs, with the specific surface area determined on the silica by nitrogen absorption. This comparison is made in the following way: In measuring the ultimate units in the electron micrographs, the assumption is made that each unit is a separate and distinct particle and is not linked appreciably to other particles, but lies only in physical but not chemical contact with the other particles. On this basis, the specific surface area of the material is calculated, taking the density of the ultimate units as 2.2 g./cc. which is the average density of amorphous silica. Then the true specific surface area of the silica powder is determined by nitrogen absorption. In the case of silica units which are united together, or coalesced, to some degree to form coherent aggregates, the specific surface area calculated from electron micrographs is greater than the true specific surface area as determined by nitrogen, since some of the apparent surface area of the units is taken up by the direct points of contact with adjacent particles. The degree to which the units are thus coalesced together, may be expressed by the coalescence factor $S_c/S_n$, where $S_c$ is the surface area calculated from the electron micrograph, and $S_n$ is the surface area as determined by nitrogen. With perfectly smooth units which are not coalesced to any appreciable extent, this ratio $S_c/S_n$ would equal 1.0. However, in actual practice, in finely divided silicas in the size range 10 to 100 millimicrons, this factor is approximately 0.8 for non-coalesced particles, obtained for example, by the evaporation of silica sols. The reason for the value 0.8 rather than 1.0, is that the surface of the particles is not completely smooth, but is believed to consist of extremely small irregularities and indentations not visible in the electron microscope, so that the calculated surface area is somewhat smaller than the surface area as determined by nitrogen absorption. Further, when the average diameter of the ultimate units approaches 10 millimicrons, it is not possible to get very accurate measurements of the coalescene factor since the limit of resolution of the electron microscope is about 2 millimicrons. Relatively significant measurements have, however, been made on particles with average diameters of about 15 millimicrons or greater. In such cases, where the units have a coalescence factor greater than about 0.9 and particularly where this factor exceeds about 1.0 as determined by actual experiment, the units are present in the form of firm, coherent aggregates.

Large coherent aggregates having values of $S_c/S_n$ higher than about 1.3 are so strong that the material is difficult to comminute. An especially preferred ultimate unit average diameter range is between 15 and 30 millimicrons. Powders having ultimate units in this size range and coalescence factors in the range 0.9 to 1.3 can be recovered directly from water in the form of supercolloidal aggregates and remain as soft, light, smooth-feeling powders which are readily rendered hydrophobic by surface-esterification.

While the above discussed coherent aggregates of ultimate units of about 10–100 millimicrons' average diameter have the advantage that, even when in the form of a close packed aggregate, the average pore size remains at or above 4 millimicrons, nevertheless, coherent aggregates of smaller ultimate units have advantages of a different kind. The aggregates of such smaller units have specific surface areas in excess of 200 m.$^2$/g.

When the specific surface area exceeds about 200 m.$^2$/g., the proportion of silicon atoms on the surface of the material, relative to the total number of silicon atoms present in the siliceous solid phase, becomes relatively high. For example, in the case of a precipitated silica having a surface area of 200 m.$^2$/g., more than 10% of all the silicon atoms are on the surface of the extremely small, dense, ultimate units of silica in the aggregate. With materials having specific surface areas greater than about 200 m.$^2$/g., very marked physical effects are brought about by surface modification. For example, in the thickening of oils and organic coating compositions with fine silica having a specific surface area of over 200 m.$^2$/g., the improvement in properties brought about by esterification becomes very important.

Surface esterification also prevents shrinkage of such high surface area materials. It has been found that in the case of aggregates of siliceous solids having surface areas greater than 200 m.$^2$/g., it is difficult to dry such materials from water without substantial shrinkage, due to the great surface activity and the great affinity of the exposed surface for water, which tends to cause shrinking together and densification of the supercolloidal particles as water is removed. However, once such materials have become surface-esterified by the process of this invention, the tendency to absorb water or moisture is greatly diminished, and, particularly when such materials are highly surface-esterified and thereby rendered hydrophobic, shrinkage by exposure to water and subsequent drying, is practically eliminated. Hence amorphous silicas having specific surface areas of at least 200 m.$^2$/g. constitute an important embodiment of the invention.

In the case of precipitated amorphous silicas, there is a preferred range of about 200 to 400 m.$^2$/g., based on the fact that in this range the supercolloidal particles or aggregates can be obtained in a dry state without bringing about a considerable collapse of the porous structure by replacing the water with a water-miscible organic solvent such as acetone and then drying. This powder is especially suitable for subsequent esterification. It is, of course, possible to produce very voluminous aerogels, by processes of the prior art, having surface areas from 200 to 900 m.$^2$/g. Such highly porous forms of silica can be surface-esterified by the process of this invention.

It is also possible to surface-modify the surface formed by the external walls of dense, extremely finely pulverized, glassy silica gel, for example, having a specific surface area (most of which is formed by the walls of tiny pores less than 4 millimicrons' average diameter) as high as 900 m.$^2$/g. However, in such compact structures, which cannot readily be further comminuted, the esterifying agent which is trapped within these tiny pores does not contribute to the organophilic or hydrophobic character of the exposed surface of the external walls of the finely divided gel particles. Nevertheless, the ester groups on the exposed surface of the external walls of such supercolloidal particles render the surface organophilic or hydrophobic, as the case may be.

Sources of amorphous silica

Silicas precipitated in the form of finely divided, discrete particles by various methods may be esterified according to the present invention. Some of these silicas are such as have hitherto been considered "amorphous"— literally, "without determinate form." Recently, examination of such substances under the electron microscope has indicated that they have structures which, though non-crystalline, are nevertheless capable of considerable definition. By examining the profile of a piece of silica gel, for instance, it is possible to discern groups of ultimate substantially spherical units having diameters as small as three to five millimicrons. These silica units are probably siloxane polymers such as might be formed by condensation of a large number of molecules of orthosilicic acid, Si(OH)$_4$, with the formation of siloxane bonds. By supplementing the electron micrograph data obtained by measuring the nitrogen adsorption of the silica product, a substantial definition of the material is obtained.

When it is desired to produce a porous amorphous silica solid made up of coalesced relatively large (15–130 millimicron diameter) dense, substantially spherical ultimate units, the ultimate units can be prepared first and then coalesced and precipitated to form the desired porous amorphous silica solid. As disclosed in the U. S. Patent No. 2,574,902 of Bechtold and Snyder, issued November 13, 1951, products may be prepared by any of a number of processes which are characterized by "build-up." A silica sol prepared by ion-exchange in the manner described in Bird U. S. 2,244,325 may be heated to a temperature above 60° C. and further quantities of the same type of sol may be added until at least five times as much silica has been added to the original quantity as was at first present. By this means "built-up" dense ultimate units are produced. These ultimate units can be coalesced into supercolloidal particles and precipitated from the sol by the addition of a salt such as sodium sulfate or by the precipitation by the use of a small amount of a polyvalent metal salt. There may be used salts of such divalent metals as calcium, zinc, magnesium, lead, barium, or beryllium, such trivalent metals as aluminum, iron, or chromium, such tetravalent metals as titanium, zirconium, and stannic tin, and such multivalent metals as manganese. It is preferred to use those metals, the hydroxides of which are not precipitated in the pH range below 6. The soluble salts of the metals may be used, such as the chlorides, sulfates, nitrates, sulfamates, or any other soluble salt.

By the use of a few per cent, say about five per cent of such a compound, the polyvalent metal is apparently reacted with the surface of the coalesced silica particles. In any event the particles are precipitated. For the present purpose, if the amount of cation retained by the silica is substantial, it may be removed from the precipitated product by an acid wash or by cation-exchange.

The silica may also be precipitated by adding a long-carbon-chain nitrogen compound such as a long chain amine or a long chain quaternary ammonium compound, as described in Iler application Ser. No. 99,355, filed June 15, 1949. Representative of the quaternary compounds are cetyl trimethyl ammonium bromide, lauryl pyridinium chloride, lauryl trimethyl ammonium chloride and similar compounds.

Instead of the processes outlined generally above, dense ultimate units comparable in character to those above described may be prepared by adding an acid such as sulfuric to a hot (above 60° C.) solution of sodium silicate. The addition is conducted over a period of time. The sodium ion concentration in the solution must not exceed one normal. The units thus formed can be coalesced to porous supercolloidal particles and precipitated from the solution by methods as above described. The details of a typical preparation of a pulverulent silica suitable for esterification according to the present invention are described in Iler United States application Ser. No. 65,525, filed December 15, 1948.

Instead of following the precise practices of said prior application, U. S. Ser. No. 65,525, a product of the same type may be prepared by heating a silica sol to a temperature above 60° C. and adding thereto a silicate solution and enough of an acid to maintain a pH from eight to eleven, the heating to above 60° C. and the addition of silicate and acid being continued until the ultimate units in the sol have reached an average diameter of from 15 to 130 millimicrons. Details of such a process are described in a U. S. application Ser. No. 99,350, filed June 15, 1949, by G. B. Alexander, R. K. Iler, and F. J. Wolter. Following the "build-up," the units are coalesced into supercolloidal particles and are precipitated as already described above.

It is not necessary to maintain the ultimate units as separate entities until the precipitation step. They can be coalesced while being generated in dilute solution. Such products suitable for esterification according to the present invention can be prepared by any of the processes described in a U. S. application by Alexander, Iler and Wolter, Ser. No. 99,354, filed June 15, 1949. Briefly, these materials can be prepared by mixing an aqueous dispersion of active silica with coalesced aggregates consisting of a plurality of amorphous, dense, ultimate silica units and heating the mixture above 60° C. at a pH of 8 to 11, whereby the active silica accretes to the coalesced aggregates. The dispersion of active silica can conveniently be prepared by adding sodium silicate and acid simultaneously to an aqueous dispersion of aggregates. The aggregates may be prepared by adding carbon dioxide gas to a sodium silimate solution heated to a temperature of 95° C., the addition being completed over a period of about forty minutes. The $CO_2$:$Na_2O$ mol ratio should be about 1.2 and the pH of the sol around 10. The sol thus prepared can serve as a heel to which carbon dioxide gas and sodium silicate solution are added simultaneously with agitation and at a temperature of about 95° C. The quantity of $SiO_2$ in the feed solution should be about four parts for each part of $SiO_2$ originally present in the heel. The silica nuclei which are built-up by this process will serve as nuclei for the build-up of the coalesced aggregates using active silica as above described. It will, of course, be evident that aggregates prepared in various manners may be used, so long as they are in finely divided particulate form.

An especially practical adaptation of the procedure just described consists in reinforcing the structure of precipitated silica in particulate form by accreting active silica thereto. Such products may more readily be dried without collapse of the gel structure to give particles of very low bulk density. Both these products, and the corresponding products in which the original ultimate units in the aggregates before reinforcement were larger than those in a gel, can advantageously be dried by adding an organic liquid such as tertiary or normal butyl alcohol and azeotropically distilling out the water. The details of such a process are described in a U. S. application by Alexander, Iler, and Wolter, Ser. No. 142,344, filed February 3, 1950.

Another suitable form of a hydrated amorphous silica powder which may be used in the invention, is one characterized as consisting of supercolloidal aggregates of ultimate units of from 10 to 50 millimicrons in diameter, described in Chemical Engineering 54, 177 (1947), produced by the Linde Air Products Company, which was available on the open market. It has a specific surface area of about 240 sq. meters per gram and a bulk density of about 0.064 gram per cc. at 3 p. s. i. g.

A further form of amorphous silica which may be used is one characterized by being an aerogel having a specific surface area of about 160 m.$^2$/g. as determined by nitrogen adsorption, and a bulk density of about 0.087 gram per cc. at 3 p. s. i. g., and available on the open market under the trade name of "Santocel C" as produced by the Monsanto Chemical Co.

Still another form of amorphous silica powder which may be used is one characterized as consisting of supercoloildal aggregates of ultimate units having an average diameter of about 25 millimicrons, a surface area of about 100 m.$^2$/g., and containing a small amount of calcium (1 to 2% by weight) produced by the Columbia Chemicals Division of the Pittsburgh Plate Glass Company and available on the open market by the trade name of "Hi-Sil."

Yet another form of amorphous silica powder which may be used is one characterized as consisting of supercolloidal aggregates having a surface area of about 210 m.²/g., and obtained from Germany under the trade name of "K-3."

Metal silicates and silica coated metal silicates

It is well known in the prior art that silicas prepared by various methods may be treated with metal salts or hydrous metal oxides to prepare metal silicates. Such metal silicates prepared from heavy metals, and excluding those containing only alkali metal ions, are water-insoluble, and are usually amorphous to X-rays. Such metal silicates are commonly used, for example, as catalysts in the petroleum industry. Metal silicates may be prepared from any of the special types of silica whose preparation is disclosed in this invention by treatment with significant amounts of metal salts, as is shown in the examples. Such metal silicates can be prepared so as to have a large number of silanol (—SiOH) groups on the surface of the particles, and consequently may be esterified by the methods of this invention. Metal silicates having a large proportion of metal ions on the surface may be activated for esterification by washing with acid to remove a portion of the metal ions and leave surface silanol groups. Thus, for example, one may so treat a precipitated hydrated calcium silicate, having a molar ratio of $SiO_2/CaO$ equal to about 3.25, containing aggregates of ultimate particles of the order of 30 to 50 millimicrons in diameter, described in Chemical and Eng. News 24, 3147 (1946), and available on the open market under the name of "Silene EF" and produced by the Columbia Chemicals Division of the Pittsburgh Plate Glass Co.

A large variety of crystalline metal silicates occur in nature in the form of the silicate minerals. A number of such minerals have potentially great usefulness as reinforcing agents, thickening agents, and the like, in organic systems because of their shape factor. However, these metal silicates are highly hydrophilic, since their surfaces contain silicon-oxygen groups, silanol groups, and metal hyoroxide groups. Consequently, a simple method for covering up or blocking the hydrophilic surface with organic groups to render the surface organophilic without destroying the advantageous shape of the particle is highly desirable. The hydrophilic surface silanol groups on the mineral particles may be esterified by the process of this invention. However, the proportion of such silanol groups on most of the minerals is very small, so that a degree of esterification necessary to render the particles organophilic cannot be attained with the natural, unmodified minerals. Loosely adsorbed metal ions, whose concentration in milliequivalents per 100 grams of the material is referred to as the ion-exchange capacity of the mineral, may be replaced or exchanged for hydrogen ions by washing with dilute acids or by treatment with ion-exchange resins. Although this increases the number of silanol groups available for esterification, in some cases the crystalline minerals so treated still retain too many hydrophilic, non-esterifiable surface groups to permit obtaining an organophilic product by the esterification process. In order to produce a sufficient number of silanol groups on the surface of the crystalline mineral particles, it is necessary to remove metal ions from the basic chemical structure of the minerals. In some cases this may require somewhat more vigorous treatment, such as reaction with acids at low pH and often at temperatures above room temperature. Although it is only necessary to remove metal ions from the surface layer of the particles, the process may be extended, for example, by increasing the concentration of acid, the temperature, or the time of treatment, until any desired amount of the metal ions, or indeed essentially all of the metal ions, have been removed. In most cases it is possible to accomplish this without destroying the shape of the ultimate mineral particles.

In addition to the above method, silanol groups may be introduced on the surface of the metal silicates by coating them with a layer of amorphous silica. This may be accomplished by treating, say, sodium silicate with an acid in the presence of the mineral particles under such conditions that the silica formed will deposit as a coating on the mineral particles.

It is desirable to use crystalline silicates which have a type of cleavage such that they can be readily reduced to very fine particles with relatively large surface areas, in order that the effect of the surface treatment will create a significant change in the properties of the material. Thus, the materials should have a surface area of at least 1 m.²/g., and surface areas larger than 25 m²/g. are preferred. A large number of the silicate minerals may be readily reduced to regularly shaped ultimate crystallite units which are supercolloidal in one or more dimensions, but which also have one or more dimensions less than 0.5 micron or even less than 0.1 micron. Thus, for example, the asbestos type minerals may be readily reduced to long, thread-like or fibrous particles less than 0.1 micron in diameter and with lengths ranging from 0.5 micron to as much as several inches. The asbestos minerals which may be employed as starting materials in this invention include: chrysotile asbestos and serpentine (hydrous magnesium silicates), and amphiboles such as crocidolite asbestos (a sodium magnesium iron silicate), amosite (an iron silicate), tremolite (a calcium magnesium silicate), and anthophyllite (a magnesium iron silicate). The clay minerals which are useful as starting materials in this invention have a rod- or needle-like, a lath-like, or a plate-like structure. Examples of the clays which have needle-like particles are halloysite (an aluminum silicate) and attapulgite (a magnesium aluminum silicate). Lath-like clays include hectorite (a magnesium lithium silicate) and nontronite (a magnesium aluminum iron silicate). The two main classes of plate-like clays are the kaolins, which include kaolinite, nacrite, and dickite (aluminum silicates), and the bentonites, which include beidillite, saponite, and montmorillonite (magnesium aluminum iron silicates). The micaceous minerals are also plate-like in nature, and may be used as starting materials in this invention. They include phlogopite (a potassium magnesium aluminum silicate), muscovite (a potassium aluminum silicate), biotite (a potassium iron aluminum silicate), and vermiculite (a hydrous magnesium iron aluminum silicate).

These minerals may be reduced to their ultimate crystalline units for use in this invention by dry milling, wet ballmilling, colloid milling in a solvent, or similar known methods. It should be pointed out that the milling methods in themselves would not be capable of producing such fine particles with the desired elongated shapes were it not for the fact that the minerals are built up of the ultimate crystallite units held together in an orderly fashion, and that these are merely disoriented, separated, and dispersed by the milling methods.

In addition to the natural crystalline silicate minerals, it is also possible to synthesize crystalline metal silicates in contrast to the amorphous metal silicate precipitates and gels mentioned above. These synthetic crystalline metal silicates are usually produced by high temperature fusion methods, or by high temperature, high pressure, hydrothermal methods. In order to esterify these synthetic crystalline silicates, they must be surface-modified to introduce silanol groups by methods such as acid-treatment or coating with amorphous silica as described above.

The lowest specific surface area limit of 1 m.²/g and the preferred lower limit of 25 m.²/g. applies both to metal silicates and amorphous silica coated metal silicates.

Water-insoluble silicates, such as the colloidal clay minerals, which are treated with acid to remove metal ions from the surface and thus provide reactive—SiOH groups, are ordinarily not obtainable with a specific surface area greater than about 500 m.²/g. This, therefore, represents approximately the present practicable upper limit of the specific surface area of the water-insoluble silicates which are suitable for surface modification by the process of this invention.

In an alternative method of providing —SiOH groups on the surface of water-insoluble silicates, amorphous silica can be deposited upon the surface of the silicate in order to provide a surface of reactive —SiOH groups. In this case, the amount of silica which is required to form a thin layer on a water-insoluble silicate having a specific surface area as high as 500 m.²/g., amounts to a considerable percentage by weight, so that after the application of the amorphous silica coating, the specific surface area is smaller, due to the added weight of amorphous silica, so that the present maximum practical value amounts to about 200 m.²/g.

THE ESTERIFICATION PROCESS

Now in an esterification process of the present invention a substrate which is in a supercolloidal state of subdivision and has an internal structure of inorganic siliceous material with a specific surface area of at least 1 m.²/g. is brought into contact with methanol and the mixture is heated under anhydrous conditions at a temperature above about 100° C., whereby chemical combination of methoxy groups with the siliceous substrate is effected.

Maintaining the system anhydrous

In order to effect the esterification it is necessary to maintain anhydrous conditions. It is important to start with as nearly anhydrous materials as possible and for this reason the siliceous substrate is advantageously dried prior to use. Also, it is most feasible to start with absolute methanol as the esterifying agent.

By "anhydrous" is meant that the water content is no more than a trace. In the early stages of the process no more than about 1% by weight of water should be present and in the later stages the water content should be no more than 0.1% and preferably even less than this. By "absolute" methanol is meant methanol as free of water as it is practicable to produce.

It will be recognized, however, that water is formed during the esterification process and it is therefore not possible to maintain anhydrous conditions unless a means is provided for removing this water of reaction. This may be accomplished by continuously or intermittently removing a portion of the methanol from the esterification reaction zone and passing it in contact with a dehydrating agent or subjecting it to a fractionation to remove the water. The problem is complicated, however, by the fact that at the temperatures employed the system is under superatmospheric pressure.

A particularly efficacious mode of operation is to heat the siliceous substrate with absolute methanol to the temperature of reaction, maintain such temperature for a time sufficient to effect a partial esterification by the methanol, vent the vapor from the system and replace it with anhydrous methanol, and repeat this cycle as many times as required to reach the desired degree of methoxylation of the siliceous material. Optionally, the methoxylated substrate may be dried under vacuum at elevated temperature between each cycle. This insures that a new equilibrium will be reached in the following cycle. As will be seen from the examples given below, a higher degree of esterification is achieved by this method on each successive cycle.

The heating conditions

To obtain the desired degree of esterification with methanol it is necessary to heat the anhydrous mixture of methanol and siliceous substrate above 100° C. The temperature should not, of course, be permitted to go so high that the methanol is decomposed or the structure of the substrate is affected. A temperature of 300° C. is usually entirely safe in this respect.

In a preferred embodiment of the invention the temperature is maintained above 150° C. and in a specifically preferred aspect the temperature may be from about 200 to 300° C.

It will be noted that the temperatures specified are above the boiling point of methanol at atmospheric pressure. This means that the reaction is carried out under elevated pressure. The pressure may be built up by operating in a closed system whereby the heating creates the pressure autogenously. Alternatively, the methanol may be supplied from an outside source as a vapor under pressure. If a continuous dehydration of the methanol is desired, the methanol may be vented continuously from the system or the entire dehydration may be effected under pressure.

Time of heating

The time of heating must be sufficient to effect the desired degree of esterification under the particular conditions of temperature and water content employed. The more completely anhydrous the system and the higher the temperature, the shorter will be the time necessary to effect a particular degree of esterification. With no particular precautions to keep the methanol absolutely dry and at the minimum temperature of 100° C., a period of several days may be necessary to achieve a high degree of esterification; on the other hand (for instance), at 225° C. with absolute methanol a substantial degree of esterification is obtained in one hour.

THE ESTERIFIED PRODUCTS

The methanol-esterified products are compositions which are organophilic solids in a supercolloidal state of subdivision having an internal structure of inorganic siliceous material with a specific surface area of at least 1 m.²/g. and having methoxy groups chemically bound to said internal structure.

The products are organophilic and in the case of most siliceous substrates they necessarily have a degree of esterification such that there is present on the surface of the siliceous particles at least 400 methoxy groups per hundred square millimicrons of substrate surface area.

The products have an internal structure of inorganic siliceous material as has already been described above in detail and have a coating of methoxy groups upon the surface of such substrates.

A particularly preferred product of the invention is one in which the substrate consists of aggregates of dense ultimate units of amorphous silica, the aggregates having at least one dimension of at least 150 millimicrons and thus being in a supercolloidal state of division. The aggregates may be much larger but are pulverulent and can be milled and readily broken down to a smaller size. The substrate particles are coherent in that the ultimate units are so firmly attached to each other that they are not readily separated by simple means such as stirring in a fluid medium. The ultimate units may have an average diameter of about 10 to 100 millimicrons, or the ultimate units may have an average diameter below 10 millimicrons and be joined in very open networks.

In the preferred product just described the siliceous substrate is porous, that is, it has exposed surfaces on the interior of the particle which are connected to the exterior so that liquids and gases can penetrate the pores and reach the exposed surfaces of the pore walls.

A specifically preferred product is one having the above-described characteristics in which the non-porous ultimate units are substantially spherical and have an average diameter in the range from 6 to 12 millimicrons, the substrate having a specific surface area of about 250 to 400 m.²/g. and an average pore diameter of at least 4 millimicrons. This particular substrate is preferably reacted upon its surface with methoxy groups to such an extent that it is organophilic and more particularly to the extent of at least about 400 methoxy groups per hundred square millimicrons of substrate surface area.

The products of this invention are useful for any purpose in which the presence an organic, chemically bound surface coating upon a siliceous particulate substrate is desirable. The products are particularly useful, for instance, as a means for dispersing siliceous fillers and reinforcing agents into organic plastic and elastomeric polymers. For instance, the products may be readily dispersed into silicone elastomers. This use is described and claimed in application Serial No. 287,046 of Richard O. Braendle, filed concurrently herewith.

The invention will be better understood by reference to the following illustrative examples in addition to those already given.

Example 1

A commercially available aqueous 30% silica sol of the type described in U. S. Patent No. 2,574,902 to Bechtold and Snyder, containing 17 m$\mu$ colloidal particles, was completely deionized by successive passes through anion and cation exchangers. The deionization process is described and claimed in the copending U. S. application of Frederick J. Wolter, Serial No. 213,480, filed March 1, 1951.

A silica powder was obtained by gelling the deionized sol and drying the gel at 120° C. for 16 hours. The dried material was micropulverized to a fluffy white powder. The specific surface area of this dried material as determined by nitrogen adsorption was 187 m.$^2$/g.

Ten parts by weight of the dried material was heated to 250° C. for 30 minutes, and then mixed with 40 parts by volume of absolute methyl alcohol. The resulting slurry was heated at 225±5° C. for one hour under autogenous pressure. After cooling, the silica product was filtered from the methanol, and dried at 102° C. for 3 hours under vacuum. The dried material was found to contain 1.57% carbon by chemical analysis. This corresponds to a degree of esterification of 440 methoxyl groups per 100 sq. m$\mu$ of silica surface.

About 8 parts by weight of this esterified material was slurried with 40 parts by volume of absolute methanol, and the resulting slurry was heated to 230±10° C. for one hour under autogenous pressure. The product was recovered by filtration and vacuum dried at 102° C. for 16 hours. This material was found to contain 1.8% carbon by chemical analysis. This corresponds to a degree of esterification of 500 methoxy groups per 100 sq. m$\mu$ of silica surface. This product was appreciably hydrophobic.

Five and one-half parts by weight of this material was again slurried with 40 parts by volume of absolute methanol, and the slurry heated to 225±5° C. for one hour under autogenous pressure. The esterified product was again recovered by filtration and after drying at 100° C. for 3 hours under vacuum was found to contain 1.76% carbon by chemical analysis. This corresponds to a degree of esterification of about 500 methoxy groups per 100 sq. m$\mu$ of silica surface.

This procedure was again repeated using 3.4 parts by weight of the previously esterified material slurried in 40 parts by volume of absolute methanol, the heating carried out at a temperature of 261±5° C. The product was again recovered by filtration, and after drying for 4 hours at 102° C. under vacuum was found to contain 1.87% carbon by chemical analysis. This corresponds to a degree of esterification of 540 methoxy groups per 100 sq. m$\mu$ of silica surface.

Example 2

One hundred parts by weight of the dry, non-esterified silica product prepared as described in Example 1 were heated to 200° C. for one hour and then slurried in absolute methanol to form a thin slurry.

The resulting slurry was heated at 275° C. for one hour under autogenous pressure. The resulting silica product was filtered from the slurry, and dried under vacuum. It was found to contain 1.64% carbon by chemical analysis. This corresponds to 460 methoxy groups per 100 sq. m$\mu$ of silica surface.

This esterified product was reslurried in excess methanol and further esterified by heating to 290° C. for one hour under autogenous pressure. The product was filtered from the excess methanol, dried under vacuum and was then found by chemical analysis to contain 2.05% carbon. This corresponds to a degree of esterification of 580 methoxy groups per 100 sq. m$\mu$ of silica surface. The material at this point was appreciably hydrophobic.

Example 3

A water-wet filter cake containing about 6% silica in the form of finely divided, precipitated, reinforced aggregates of silica is prepared in the following manner:

A 425-pound portion of a sodium silicate solution containing 2.39 grams SiO$_2$ per 100 milliliters of solution and having a molar SiO$_2$:Na$_2$O ratio of 3.25:1 was charged to a 100-gallon steel tank equipped with a one-half horsepower, 400 R. P. M. "Lightnin" mixer driving a 10" diameter, 3-bladed propeller. The silicate was heated to a temperature of 35±2° C. by steam injection. A sufficient amount (about 162 pounds) of a solution containing 2.40% H$_2$SO$_4$ was added uniformly over a period of about 30 minutes to bring the pH to 9.7±0.2 as measured at 25° C. During this period, the temperature of the reacting mass was maintained below 40° C. The amount of acid added during this step of the process was equivalent to about 80% of the Na$_2$O in the original sodium silicate. The sodium ion content remained below 0.3 N throughout the process. The clear sol thus obtained was heated to 95° C. in about 15 minutes. After heating, the sol contained discrete, ultimate, silica units which were about 5–7 millimicrons in diameter, and had a pH of about 10.1.

Solutions of sodium silicate and sulfuric acid were then added simultaneously at a uniform rate over a period of 2 hours through inlets located close to the vortex formed by the agitator. An 85.4-pound portion of the sodium silicate solution was used, which contained 13.22 grams of SiO$_2$ per 100 milliliters of solution and had a molar SiO$_2$:Na$_2$O ratio of 3.25:1. The sulfuric acid was a 4.65% aqueous solution and was added in an amount to maintain the pH of the reaction mixture at 10.3±0.2 as measured at 25° C. throughout the course of the reaction. Such an amount is sufficient to neutralize about 80% of the Na$_2$O in the silicate solution and maintain the sodium ion concentration below 0.3 normal throughout the process. The temperature was maintained at 95° C. throughout the addition of acid and silicate.

During the heating of the initial sol, the tiny, discrete particles of the sol increase in size, and then during the initial addition of silicate and acid they become chemically bound together in the form of open networks or coherent aggregates of supercolloidal size, wherein the colloidal particles are present as dense ultimate units. The aggregates are precipitated. In the subsequent simultaneous addition of silicate and acid, the aggregates are reinforced. Since about 1 part of silica was added for each part of silica in the original sol, the build-up ratio on the aggregates was about 1:1.

Still maintaining a temperature of 95° C., the pH of the solution was adjusted from 10.3 to 5.0 by adding 4.65% sulfuric acid at a rate of about 0.24 gallon per minute for 20 minutes, and then adding small portions followed by repeated pH determinations, until the pH was 5 as measured at 25° C. This required about 32 pounds of the sulfuric acid solution.

The slurry thus obtained was then maintained at 85–95° C. without agitation for 4 hours, in order to further coagulate the precipitate to aid in filtration. The precipitate was filtered in several portions on a 50-gallon Nutsche, using nylon cloth as a filter medium. The filter cake was washed on the filter with 5 displacements of cold water, and then sucked as dry as possible.

Fifteen hundred parts by weight of this water-wet cake was washed thoroughly. The pH of the final wet cake slurried in distilled water after washing was about 5.

In order to replace the water in the wet cake with methanol, about 750 parts by weight of the wet cake was slurried with 1200 parts by weight of absolute methanol. The solid material was then filtered from the slurry, and this wash with methanol was repeated twice, each time slurrying the wet cake in 3 parts by volume of methanol for each part by weight of wet cake received.

Finally, the methanol-wet cake was slurried in 2,000 parts by volume of anhydrous methanol and heated to 325° C. for ½ hour under autogenous pressure. At the end of this time, the vapors were vented from the closed system over a period of ¼ hour. Fresh absolute methanol was added to the solids received, and this heating and venting procedure was repeated twice.

The final product was received as a fluffy white powder which was partly hydrophobic and was organophilic. It was found to contain 3.27% carbon by chemical analysis, and had a specific surface area as determined by nitrogen adsorption of 329 m.$^2$/g. This corresponds to a degree of esterification of about 500 methoxy groups per 100 sq. m$\mu$ of silica surface.

ANALYTICAL METHODS

In the foregoing description of this invention it has been necessary to refer to a number of characterization methods in order to set forth the novel nature of the products produced and to describe the siliceous substrates treated. Many of these methods have been especially adapted to the particular needs at hand. Accordingly, they are described below in some detail.

Methods of measuring particle size

The gross particle size and shape, and the particle size distribution may be determined by a number of standard methods whose choice for use in a particular case depends upon the approximate size and shape of the particles and the degree of accuracy desired. A number of such methods are discussed in Symposium on New Methods for Particle Size Determination in Sub-Sieve Range, published by the American Society for Testing Materials, Philadelphia, Pa., March 1941.

For coarse, granular material or siliceous material in the form of relatively long fibers or plates, the dimensions of individual particles or coherent aggregates may be estimated with the unaided eye and the ruler or calipers. A measure of the particle size distribution may be obtained by various standard sieve analysis methods. For particles of powdered material, in which the aggregates are too small to be measured with the unaided eye, the light microscope may be used with a calibrated scale, and the image may be projected on a large screen to make the measurements less laborious. When the majority of the material lies below one micron, ordinary microscopic methods are difficult to use with accuracy, but ultra-microscopic methods or light scattering methods can be used for such materials with some success, to determine average size on samples in which the particles have essentially the same size. The electron microscope, which has a resolving power some 50 times greater than the best ultra-violet light microscope, is particularly well adapted to the determination of particle size and shape, particle size distribution, and degree of dispersion and flocculation or aggregation in any finely divided material which has ultimate particles in the size range of a few microns to about 5 millimicrons. The method used in mounting the sample for observation under the electron microscope in a manner which will insure an accurate reproduction of the material as it exists, and avoid changes due to the process of its examination, the method for measuring particle sizes from projected images of electron microscopic photographs, and statistical methods for determining the mean diameters and mean specific surface areas from the particle count data are described in detail by J. H. L. Watson in Analytical Chemistry, 20, p. 576 (June 1948). The electron microscopic investigation of many of the silicate minerals of the type which have been used as the starting materials in this invention is described by Turkevitch and Hillier in Analytical Chemistry, 21, p. 475 (April 1949).

A complete distribution curve of particle sizes and their respective amounts can readily be obtained for silicate minerals such as the clays, by means of the standard sedimentation methods using the Bouyoucos hydrometer. Since the method depends upon the application of Stokes' law, the results are expressed in terms of the "equivalent spherical diameter" of the particles. A detailed description of this method is given in Kaolin Clays and their Industrial Uses, J. M. Huber Corp., New York, N. Y., 1949, page 99.

Sedimentation may, of course, be enhanced by the use of a centrifuge and various centrifugal methods may consequently be used in the study of particle size distribution. Elutriation methods in liquid or in air may also be used on a commercial scale, to fractionate particles into desired size ranges. All of the materials of this invention can be removed from suspension in fluid medium by filtration. Consequently, colloidal particles which may be present as impurities in the starting materials are usually removed during one of the filtration steps in the process, since the colloidal particles pass through the filter.

Methods for determining specific surface area and pore volume by nitrogen adsorption Since the nitrogen molecule has a diameter of less than 0.5 millimicron, it can penetrate essentially all of the pores of the siliceous materials of this invention, and is readily adsorbed by all of their surfaces. The accepted method for measuring specific surface areas by nitrogen adsorption is given in an article "A new method for measuring the surface areas of finely divided materials and for determining the size of particles" by P. H. Emmett in the publication, Symposium on New Methods for Particle Size Determination in the Sub-Sieve Range, published by the American Society for Testing Materials, March 4, 1941, p. 95. The value of 0.162 square millimicron for the area covered by one surface adsorbed nitrogen molecule is used in calculating the specific surface areas. These are reported in square meters per gram, m.$^2$/g.

Pore volumes may be determined from the nitrogen adsorption isotherms, as described by Holmes and Emmett in Journal of Physical and Colloid Chemistry, 51, 1262 (1947). The pore diameter values are obtained by simple geometry from an assumed cylindrical pore structure.

Measurement of bulk density

The bulk densities of dry, finely divided silica powders are measured under a compressive load of three pounds per square inch in excess of atmospheric pressure (p. s. i.) in a 10-inch by ½-inch glass tube fitted with a flat, fritted glass bottom. A known weight of the silica is compressed by a stainless steel rod of known weight, acting on the surface of the silica through a porous glass plug resting on the surface. The bulk density is calculated by dividing the known weight (in grams) of the sample by the measured volume (in cc.) of silica at compression equilibrium by the known weight (in grams) of the sample. The bulk density in pounds per cubic foot is 62.4 times the density in grams per cubic centimeter.

In measuring the bulk densities of the siliceous materials under compressive loads of 78 p. s. i. and 1560 p. s. i., a weighed silica sample is introduced into an accurately machined, hollow cylindrical, steel pill press, and pressure is applied through an accurately fitting solid, steel plunger by means of a hydraulic Carver laboratory press.

The pressure is slowly increased to the desired point and the displacement of the plunger is measured by means of a cathetometer reading to $\frac{1}{10}$ of a millimeter. From the known constants of the instrument the volume of the silica under the equilibrium pressure may be calculated. The density is then calculated from the known weight and volume as described above.

*Measuring the adsorption of methyl red dye*

The specific hydroxylated surface areas of silicas having surface silanol groups may be calculated by measuring the amount of methyl red dye which will adsorb on such surfaces. A description of such a method for determining surface areas has been published by I. Shapiro and I. M. Kolthoff in the Journal of the American Chemical Society, vol. 72, page 776, (1950).

It is essential for the correct application of the dye adsorption method that the free alkali metal ion concentration at the silica surface be low. If necessary this may be reduced by washing the silica or by ion-exchange techniques so that the pH of a water slurry of the product is less than 10.0. The silica is prepared for the test by drying it to constant weight at 110° C.

The test is carried out by agitating a suspension of a few tenths of a gram of a dried silica sample in an anhydrous benzene solution of methyl red. The acid form of methyl red, p-dimethylaminoazobenzene-o-carboxylic acid $(CH_3)_2C_6H_4=NC_6H_4COOH$ is used. Equilibrium adsorption is reached in about two hours, and an equilibrium concentration of 400 milligrams of dye per liter insures saturation adsorption. The methyl red adsorption capacity is calculated from the observed decrease in dye concentration during the shaking, in relation to the weight of the sample as follows:

Methyl red adsorption capacity =

$$\frac{\text{Grams of dye adsorbed}}{\text{Grams of silica employed}}$$

Adsorption spectrophotometric observations at 4750 A. are most convenient for the analyses of both the original and the equilibrium benzene solutions of methyl red. In the work described in this case a Beckman Model DU Series 2561 spectrophotometer was used. The specific hydroxylated surface area in square meters per gram is calculated according to the following equation, utilizing the covering power of each adsorbed methyl red molecule which is approximately 1.16 square millimicrons, as determined by correlation with nitrogen adsorption measurements:

Specific hydroxylated surface area in $M.^2/g.$ =

$$\frac{\text{Methyl red adsorption capacity}}{\text{Molecular weight of methyl red}} \times 1.16 \times 10^{-20} \times \text{Avogadro's No.}$$

When the siliceous materials are esterified the methyl red dye will not adsorb on the esterified portions of the surface, i. e., the portions of the surface covered by ester groups chemically reacted therewith. Consequently, measurement of the adsorption of methyl red dye before and after esterification shows a decrease which is proportional to the decrease in exposed specific hydroxylated surface area. One convenient way of expressing these values is to calculate the number of dye molecules adsorbed per 100 square millimicrons of total surface. Thus, for a completely hydroxylated, non-esterified surface, each dye molecule occupies an area of 1.16 square millimicrons, permitting a maximum of 86.3 dye molecules to be adsorbed on every 100 square millimicrons of exposed surface. This number may be called the M. R. value, and is listed under this heading in the data given in the examples.

The M. R. value for an esterified surface may be calculated as follows:

M. R.

$$= \frac{\text{Methyl red dye molecules}}{100 \text{ square millimicrons}}$$

$$= \frac{\text{Methyl red adsorption capacity}}{\text{Molecular weight of methyl red}} \times \frac{\text{Avogadro's No.}}{S_n \times 10^{16}}$$

$$= \frac{223,000 \times \text{methyl red adsorption capacity}}{S_n}$$

where $S_n$ is the specific surface area of the unesterified siliceous material as determined by nitrogen adsorption, and the molecular weight of the acid form of methyl red is 269.3, and Avogadro's No. is $6.02 \times 10^{23}$.

Since the amount of dye adsorbed by the sample is measured by difference, the probable error, percentagewise, increases as the amount of adsorbed dye decreases. Thus for specific hydroxylated surface areas of 100 $m.^2/g.$, variations of as much as 5 $m.^2/g.$ are possible. For samples which adsorb very little dye, a value less than 5 $m.^2/g.$ is considered to be essentially zero.

*Openness of packing of silica substrates*

Linseed oil absorption gives an indication of the openness of packing of the ultimate units in silica aggregates. The more open the packing, the greater the oil absorption. The test may be carried out as described in A. S. T. M. Standards for 1949, vol. 4, p. 169. A 0.5–1.0 gram sample of the powder which has been dried at 110° C. is placed on a glass plate and raw linseed oil is added drop by drop, the mixture being stirred and gently mashed by means of a steel spatula until crumbling just ceases, and the product can be molded into a ball. As the sample of powder is titrated with oil, the oil penetrates the pores of the powder, filling all void space, both intra- and interaggregate. The powder remains essentially dry in appearance until the pores within the aggregates are filled, and then becomes increasingly cohesive as the voidage between the aggregates is filled. At the point that all free space is filled, the material loses its friable nature and can be molded into a ball. The amount of oil required in the test may be expressed in terms of ml. of oil per 100 grams of powder. For the products of this discussion, the oil absorption depends upon the openness of packing of the ultimate units and the specific surface area. By comparing oil absorption at constant specific surface area, a measure of the openness of packing can be obtained. In a preferred embodiment of this invention the substrate used may have an oil absorption expressed in milliliters of oil per 100 grams of powder of from 1 to 3 times the specific surface area expressed in square meters per gram.

*Extent of reinforcement of silica aggregates*

An important factor determining the nature of some of the silica substrates used in making estersils is the extent of reinforcement of the aggregates or the strength of bonding between the ultimate units in the three-dimensional network. The places where the ultimate units in a gel adhere to each other have been referred to in the art as "junction points," but the forces by which the ultimate units may be held together at these "junction points" are not commonly understood. In the case of the silica aggregates which are reinforced by accretion of silica, the ultimate units become cemented together at the "junction points." I have called this cementing action "coalescence." The degree of coalescence may be measured by a controlled depolymerization of the silica, measuring what per cent of the silica must be dissolved before the aggregates disintegrate to the ultimate units which disperse to a colloidal sol; this is called the "coalescence factor."

A test has been devised in order to determine this factor. The sample, properly prepared, is suspended in and permitted to dissolve slowly in a dilute solution of alkali. In the course of this dissolution, the course of the disintegration of the aggregates is observed by noting the decrease in the turbidity of the suspension. The aggregates, being supercolloidal in size, cause the suspension to be initially turbid; as the aggregates are disintegrated the turbidity of the suspension decreases and the transmission of light through the suspension increases. Simultaneously the amount of silica which has passed into solution is determined analytically. From a curve obtained by plotting the percentage transmission of light through the suspension versus the per cent silica which has dissolved at the corresponding moment, the coalescence factor is determined as hereinafter described. This test is applicable to siliceous substrates having a specific surface area in the range of 60–400 m.$^2$/g.

The coalescence factor is determined by the following method: The specific surface area is measured by nitrogen adsorption, as already described. To free the dry powder from organic matter, a sample is ignited in a vertical tube in a slow stream of air, increasing the temperature in one hour from 250–450° C. Further ignition for 30 minutes at 450° C. in pure oxygen is employed to remove last traces of organic matter. Acid soluble components are removed by leaching the ignited sample (or a sample free from organic matter) in hot (80–85° C.) 2 N HCl for 30 minutes and then washing to a pH of 4 with a minimum amount of water to remove any metal ions. Solids content of the resulting wet silica is determined by evaporation and ignition (to 450° C.) of a separate weighed sample.

The coalescence determination is carried out on a sample of the wet silica substrate containing 1 gram of solids. The sample is diluted to 100 ml. with water, warmed to 50° C. in a stirrer equiped flask, and titrated with 1.0 N NaOH. Sufficient base is added immediately to raise the pH to about 11.2 (1.0 ml. per 90 m.$^2$/g. of specific surface area, but not less than 1.5 ml. nor more than 4 ml.), and further steady addition is maintained at such a rate as to hold the pH as close as possible to 11–11.5. During this treatment, depolymerization, or solution of polymeric silica, occurs because of the presence of hydroxyl ions. The product of this depolymerization is monomeric sodium silicate. The reaction of this monomeric silicate with acid molybdate reagent prepared from ammonium molybdate and sulfuric acid results in the formation of a yellow silico molybdate complex, $SiO_2 \cdot 12MoO_3 \cdot xH_2O$. It has been demonstrated that the color intensity of this complex is proportional to the amount of monosilicic acid which has reacted with the molybdate reagent. Not only does the molybdate reagent react rapidly with monomeric silicic acid, but the acid nature of the reagent practically arrests depolymerization of any high molecular weight colloidal silica present when an aliquot of the silica sample is mixed with the acid molybdate reagent. The reaction of this agent with monosilicic acid can therefore be used to determine the amount of monomer present in the depolymerizing solution at any given time.

Percentage transmission and percentage monomeric silicate are measured as frequently as possible during the depolymerization treatment. Transmission is measured by means of a Beckman quartz spectrophotometer, Model DU, at a wavelength of 400 millimicrons and with a cell length of 1 cm. In making the analysis for monomeric silicate, a 0.1 ml. aliquot from the depolymerization medium is diluted to 50 ml. with a freshly prepared 0.1 N $H_2SO_4$ solution of ammonium molybdate (this solution contains 4.0 g. of $(NH_4)_6Mo_7O_{24} \cdot 4H_2O$ per liter) and the optical density of the resulting solution is measured on the spectrophotometer. Distilled water is used as the reference solution for these measurements. The depolymerization is followed in this manner until about 80 or 90% of the total silica has been dissolved. This may be estimated from the fact that the sample was chosen to contain about 1.0 mg. of silica, and under the conditions of this experiment, if all of the silica were in the form of monomer, the optical density would be 0.72. To determine the total silica content of the aliquot taken, the solution is made 0.5 N in NaOH and heated in live steam in an alkali-resistant flask for at least 2 hours, so that the last traces of silica are depolymerized to monomer. Total silica is then determined by the molbdic acid method above, and percentage silica at any point during the depolymerization is determined from the ratio of the optical density at that point to the optical density after all the silica in the sample was converted to monomer.

For samples composed of substantially spheroidal, dense ultimate particles which are aggregated or reticulated, the percentage of silica involved in the bonding or coalescence of these ultimate units is shown by the position of the inflection point in a plot of percentage soluble silica versus transmission.

The percentage soluble silica at the inflection point is termed the "coalescence factor" of the sample. In a preferred embodiment, the siliceous substrates which are esterified to make products have a coalescence factor of from 30 to 80%.

Specific depolymerization rate

A test which gives a measure of the density of the ultimate particles in the siliceous substrate is the specific depolymerization rate, K. This is determined by treating the silica with 0.01 N sodium hydroxide solution at 30° C. and measuring the rate of monomer formation, i. e., the rate of depolymerization.

The specific depolymerization rate is defined as ten thousand times the rate of monomer formation per minute, divided by the specific surface area of the depolymerizing particles at the time of measurement of rate of monomer formation. Stated mathematically, $$K = \frac{10^4 \times (dm/dt)}{S_n(1-m)^{2/3}}$$

where K is the specific depolymerization rate, $(dm/dt)$ is the rate of monomer formation per minute, $S_n$ is the original specific surface area of the silica tested, and $m$ is the fraction of total silica converted to monomer at the time, $t$.

The depolymerization is measured with the molybdate reagent, as already described for the measurement of active silica and for the determination of the coalescence factor. The measurements are carried out on the dry silica powders from which organic matter has been removed as described above, the procedure consisting in acid-washing with hot concentrated hydrochloric acid to remove surface adsorbed metal ions, followed by small successive portions of distilled water, followed by acetone washing and drying at 110° C. Twenty milligrams of the dried powder are then accurately weighed and transferred to 100 milliliters of 0.01 N sodium hydroxide solution maintained at 30° C. The slurry is agitated vigorously by bubbling with nitrogen gas saturated with water vapor at 30° C. At appropriate intervals, determined by the rate of depolymerization, usually between 5 and 90 minutes, 5 milliliter aliquots are withdrawn from the depolymerizing solution and mixed with 45 milliliters of the freshly prepared molybdate reagent. The optical density measurements are made with the Beckman spectrophotometer, at a wavelength of 400 millimicrons and with a cell length of 1 cm., as already described for the determination of active silica. The amount of monomer present at any time can be calculated from the optical density reading by comparison with the final color for complete depolymerization (100% monomer).

Six to eight monomer-time readings are taken during the time that approximately half the sample is depolymerized. Total silica is analyzed in the same manner as already described, by heating the solution to 90–100° C. until complete depolymerization of the sample has occurred, as is shown by the absence of variation between consecutive analyses.

From a knowledge of the time intervals at which the monomer concentrations were measured, and of the amount of silica present as monomer at these time intervals, a graph of the monomer concentration vs. time can be constructed. The per cent silica present as monomer is usually plotted as the ordinate, while the time in minutes is plotted as the abscissa. The slope of the line so obtained can then be used to calculate the rate of monomer formation per minute. The specific depolymerization rate, K, is then calculated as described above. In one preferred embodiment silicas used to make estersils have a specific depolymerization rate of from 5 to 20, at a point where 30% of the silica has been depolymerized to monomer, i. e., $m=0.30$. Products in which the silica is not dense due to the presence of tiny pores or imperfections in the ultimate units, may have K values as high as 100. In the preferred embodiment just mentioned, the ultimate units and accreted silica are both dense.

Uniformity of the structure

In one preferred embodiment, the siliceous substrates used for making estersils are reinforced aggregates in which silica has been accreted substantially uniformly on the entire structure, and the ultimate units are of a relatively uniform size. The uniformity of the structure may be demonstrated in the process of carrying out the measurement of the coalescence factor by controlled depolymerization of the silica. Thus, the per cent transmission of the sample is measured with the Beckman spectrophotometer at a wave length of 400 millimicrons and with a cell length of 1 cm., after 90% of the total silica has been dissolved, using water as the reference liquid. The percentage transmission as measured in this way is termed the "uniformity factor." If the uniformity factor of the sample is greater than 75%, the sample is substantially uniform. In cases where the reinforcement of the structure is non-uniform, the depolymerization test will cause depolymerization of the structure at the weakest, least reinforced points first, and will not disrupt certain of the highly reinforced points even after 90% of the total silica has been dissolved. Consequently, a number of large fragments of the structure remain at this point, substantially reducing the transmission of the sample.

The uniformity of the structure can also be observed by means of the electron microscope. This method shows that the ultimate units are of a uniform size and that the "junction points" between ultimate units are reinforced to a uniform degree.

Determination of degree of esterification

The degree of esterification of the novel surface-methoxylated siliceous materials of this invention is defined as the number of methoxy groups per hundred square millimicrons of siliceous substrate surface. The degree of esterification is determined from the surface area of the siliceous substrate and the carbon content of the surface-methoxylated material. The surface-methoxylated siliceous material is thoroughly dried at, say, 100° C. under vacuum to remove the last traces of physically absorbed methanol. The carbon content of the resulting surface-methoxylated siliceous material is then determined by well-known analytical methods. To determine the surface area of the siliceous substrate, the methyl ester coating is first burned off a sample of the surface-methoxylated siliceous material by heating it slowly to about 450° C. in the presence of oxygen. This "burning off" procedure has been found to give no loss in surface area of the substrate. Consequently, the specific surface area of the substrate resulting from the "burning off" process may be used in the calculation of the degree of esterification. From the carbon content of the surface-methoxylated siliceous material and the specific surface area of the siliceous substrate the degree of esterification may be calculated from the following formula:

$$\frac{6.02 \times 10^{23} \times C}{12 \times S_n \times 10^{18}} = \frac{50,200 \times C}{S_n}$$

where C is the weight of carbon in grams attached to 100 grams of siliceous substrate and $S_n$ is the specific surface area in m.²/g. of siliceous substrate as determined by nitrogen adsorption. For example, where the specific surface area of the siliceous substrate is 187 m.²/g. and the carbon content of the surface-methoxylated siliceous material is 1.8%, the degree of esterification from the above formula is 500 methoxy groups per hundred square m$\mu$ of siliceous substrate surface.

It has also been found that the specific surface area of the surface-methoxylated siliceous material is not materially different from the original dry siliceous substrate before esterification or from the siliceous substrate obtained after "burning off" the methyl ester surface coating. Consequently, in calculating the degree of esterification the specific surface area of the surface-methoxylated particles or the specific surface area of the siliceous substrate before esterification may also be used. It is preferred however in the determination of the degree of esterification to use the specific surface area of the siliceous substrate as measured after "burning off" the methyl ester coating as described above.

I claim:

1. An organophilic solid in a super-colloidal state of subdivision having an internal structure of inorganic siliceous material with a specific surface area of at least one square meter per gram and having methoxy groups chemically bound to said internal structure, the proportion of methoxy groups being at least 400 per hundred square millimicrons of surface area of said internal structure.

2. A composition consisting of a substrate having methoxy groups chemically bound to its surface, the substrate consisting of a plurality of dense ultimate units of amorphous silica coherently joined into purverulent, super-colloidal aggregates having a specific surface area of at least one square meter per gram, the proportion of methoxy groups being at least 400 per hundred square millimicrons of surface area of said internal structure.

3. A composition consisting of a substrate having methoxy groups chemically bound to its surface, the substrate consisting of a plurality of dense ultimate units of amorphous silica, having an average diameter of 10 to 100 milimicrons, the units being coherently joined into pulverulent aggregates having a specific surface area of at least 1 m.²/g. and having at least one dimension of at least 150 millimicrons, the proportion of methoxy groups being at least 400 per hundred square millimicrons of surface area of said internal structure.

4. A composition consisting of a substrate having methoxy groups chemically bound to its surface, the substrate consisting of a plurality of dense ultimate units of amorphous silica, having an average diameter of less than 10 millimicrons, the units being coherently joined into pulverulent aggregates having a specific surface area of at least 1 m.²/g., having at least one dimension of at least 150 millimicrons, and having an average pore diameter of at least 4 millimicrons, the proportion of methoxy groups being at least 400 per hundred square millimicrons of surface area of said internal structure.

5. A composition consisting of a substrate consisting of a plurality of dense, substantially spherical, ultimate units of amorphous silica having an average diameter in the range from 6 to 12 millimicrons, the units being coherently joined into pulverulent aggregates having a specific surface area of about 250 to 400 m.²/g., having at least one dimension of at least 150 millimicrons, and having an average pore diameter of at least 4 millimicrons, the substrate having methoxy groups chemically bound to its surface, the proportion of methoxy groups being at least 400 per hundred square millimicrons of surface area of said internal structure.

6. A composition consisting of a substrate consisting of a plurality of dense, substantially spherical, ultimate units of amorphous silica having an average diameter in the range from 6 to 12 millimicrons, the units being coherently joined into pulverulent aggregates having a specfic surface area of about 250 to 400 m.²/g., having at least one dimension of at least 150 milimicrons, and having an average pore diameter of at least 4 millimicrons, the substrate having chemically bound to its surface at least 400 methoxy groups per 100 square millimicrons of substrate surface area.

7. In a process for methoxylating the surface of a siliceous material the steps comprising effecting contact between methanol and an inorganic, supercolloidal, siliceous material having a specific surface area of at least one square meter per gram and having surface silanol groups, and heating the mixture at a temperature of about from 100 to 300° C. while maintaining the water content of the system initially below 1% and finally below 0.1% by weight, whereby chemical combination of methoxy groups with the siliceous material is effected, and continuing the heating until the proportion of combined methoxy groups is at least 400 per 100 square millimicrons of surface area of the original siliceous material.

8. In a process for methoxylating the surface of a siliceous material the steps comprising effecting contact between methanol and an inorganic, supercolloidal, siliceous material having a specific surface area of at least one square meter per gram and having surface silanol groups, and heating the mixture at a temperature of about from 150 to 300° C. while maintaining the water content of the system initially below 1% and finally below 0.1% by weight, whereby chemical combination of methoxy groups with the siliceous material is effected, and continuing the heating until the proportion of combined methoxy groups is at least 400 per 100 square millimicrons of surface area of the original siliceous material.

9. In a process for methoxylating the surface of a siliceous material the steps comprising effecting contact between methanol and an inorganic, supercolloidal, siliceous material having a specific surface area of at least one square meter per gram and having surface silanol groups, and heating the mixture at a temperature of about from 200 to 300° C. while maintaining the water content of the system initially below 1% and finally below 0.1% by weight, whereby chemical combination of methoxy groups with the siliceous material is effected, and continuing the heating until the proportion of combined methoxy groups is at least 400 per 100 square millimicrons of surface area of the original siliceous material.

10. In a process for methoxylating the surface of a siliceous material the steps comprising effecting contact between methanol and an inorganic, supercolloidal, siliceous material having a specific surface area of at least one square meter per gram and having surface silanol groups, heating the mixture in a closed system at superatmospheric pressure and at a temperature of about from 100 to 300° C. the water content of the system being below 1% by weight, venting methanol and water as vapor from the system, replacing the vented vapor with anhydrous methanol, repeating the heating and venting until the water content of the system is below 0.1% and continuing the heating until the proportion of combined methoxy groups is at least 400 per 100 square millimicrons of surface area of the original siliceous material.

11. In a process for methoxylating the surface of a siliceous material the steps comprising effecting contact between methanol and an inorganic, supercolloidal, siliceous material having a specific surface area of at least one square meter per gram and having surface silanol groups, heating the mixture in a closed system at a temperature of about from 100 to 300° C. the water content of the system being below 1% by weight, to effect chemical combination of methoxy groups with the siliceous material, removing water from the system until the water content of the system is below 0.1% by weight, and continuing the heating until the proportion of combined methoxy groups is at least 400 per 100 square millimicrons of surface area of the original siliceous material.

References Cited in the file of this patent
UNITED STATES PATENTS 2,657,149    Iler _____ Oct. 27, 1953